Figure 1:
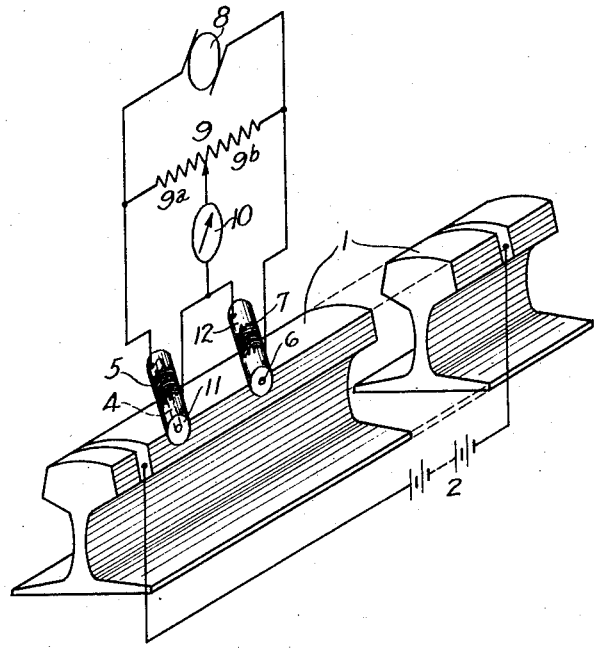

Feb. 7, 1933. T. ZUSCHLAG 1,896,737
METHOD AND APPARATUS FOR TESTING RAILS OR THE LIKE
Filed Aug. 6, 1932 2 Sheets-Sheet 1

INVENTOR,
Theodor Zuschlag
BY
Bartlett, Eyre, Scott & Keel
ATTORNEYS.

Feb. 7, 1933. T. ZUSCHLAG 1,896,737
METHOD AND APPARATUS FOR TESTING RAILS OR THE LIKE
Filed Aug. 6, 1932 2 Sheets-Sheet 2

INVENTOR,
Theodor Zuschlag
BY
Bartlett, Eyre, Scott & Keel
ATTORNEYS.

Patented Feb. 7, 1933

1,896,737

UNITED STATES PATENT OFFICE

THEODOR ZUSCHLAG, OF WEST ENGLEWOOD, NEW JERSEY, ASSIGNOR TO MAGNETIC ANALYSIS CORPORATION, OF LONG ISLAND CITY, NEW YORK, A CORPORATION OF NEW YORK

METHOD AND APPARATUS FOR TESTING RAILS OR THE LIKE

Application filed August 6, 1932. Serial No. 627,750.

The present invention relates to the art of magnetic analysis and comprises a new non-destructive method of testing materials such as rails, pipes, bars, etc. for the determination of physical or chemical flaws therein. The invention also includes novel apparatus for practicing the method.

Methods of magnetic analysis heretofore employed have involved, in one form or another, the measurement of current induced in one or more test coils of a secondary circuit; the induced current being an indication of changes in magnetic flux through the test coil or coils occasioned by physical or chemical changes in the material being tested. In such methods the specimen to be tested was either placed in a known fluctuating magnetic field or a constant direct current was passed through the specimen and relative movement occasioned between the test coil or coils and the resulting field about the specimen. The method of the present invention differs radically from the known methods above briefly described in that the permeability of a ferro-magnetic body as determined from the impedance of a circuit associated therewith is used as a measure of the magnetic field set up about the specimen to be tested and through which a known current is passed; the distribution of the magnetic field about the test specimen being a function of the physical and chemical composition thereof. In practicing the new method, direct current, or both direct and alternating current is passed through the test specimen. Preferably two ferro-magnetic bodies serving as cores to separate windings are placed adjacent different portions of the test specimen so as to have their permeability influenced by different portions of the magnetic field. A comparison of the impedance of the windings as affected by the permeability of the ferro-magnetic cores, is then made by passing alternating current in series therethrough. In practicing the method care must be taken that the average field strength is not near the saturation point of the particular material comprising the ferro-magnetic cores, but is of a value where permeability changes are large with relatively small changes in field strength. Under these conditions very small changes in the magnetic field about the test specimen will cause relatively large changes in the impedance of the windings about the ferro-magnetic cores. The impedance changes of the windings as the ferro-magnetic cores explore different portions of the field, may be indicated in a variety of ways, but preferably the windings form arms of a Wheatstone bridge network which is balanced when the field strength affecting the permeability of the cores are equal and to which alternating current from a source of constant frequency is supplied; the windings and cores being enclosed in conductive containers to prevent undesired disturbance of the balance of the bridge network.

Figure 2:
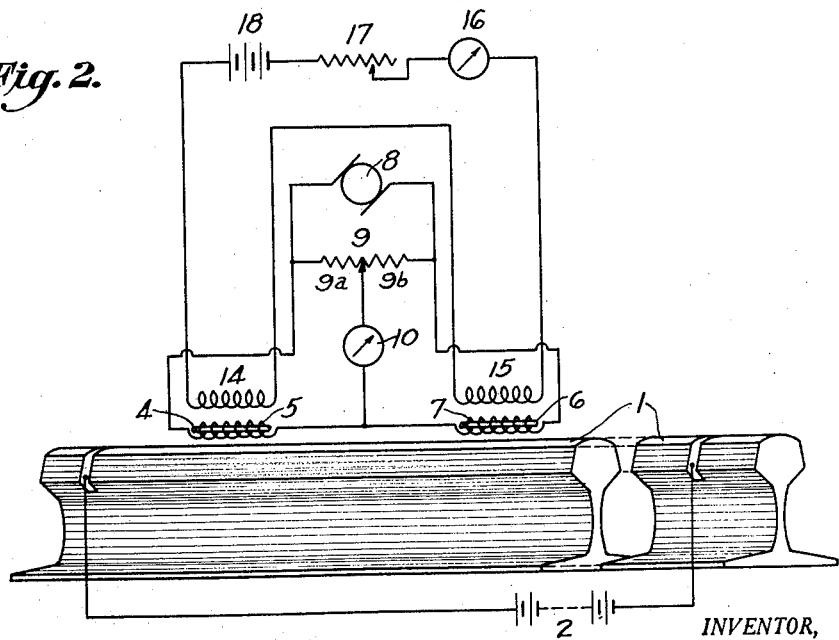
Figure 3:
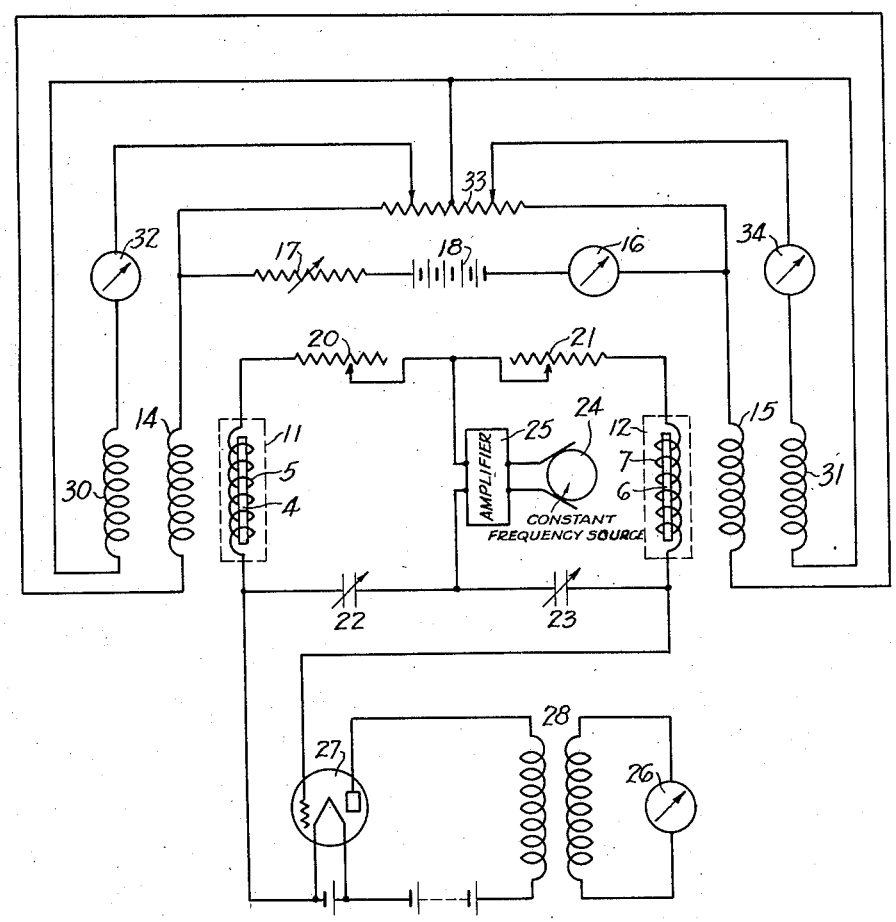

For a better understanding of the invention reference may be had to the accompanying drawings of which:

Fig. 1 illustrates diagrammatically a simple bridge type circuit arrangement for testing rails in accordance with the invention;

Fig. 2 illustrates a test circuit of the type of that of Fig. 1 but including means for adjusting the average field strength effecting the cores; and Fig. 3 illustrates a test circuit of the type of that of Fig. 1 or Fig. 2 but including compensating means for adjusting separately the field strength affecting the cores and including tuned circuits and amplifying means for increasing the sensitivity of the circuit.

In Fig 1 the specimen to be tested is indicated as a rail 1 through which direct current is passed from any suitable source of voltage, indicated diagrammatically as a battery 2. The direct current through the rail from the battery 2 sets up a steady magnetic field about the rail which, if the rail is uniform in cross section and of uniform structure, will have the same distribution at different points along the rail. If, however, there is a flaw, such as a transverse fissure or a split head or a hard spot within the rail, the distribution of the field adjacent such flaw will differ from that about other parts of the rail due to the changes in distribution of the current in the rail. The comparison of the field strength at equal distances from similar portions of the rail will thus give an indication of the presence or absence of flaws within the rail. In accordance with the present invention the comparison of such field strength is effected by comparing the permeability of two like specimens 4 and 6 of ferro-magnetic material placed so as to be influenced by the magnetic fields about different portions of the rail. Specimens 4 and 6 form cores of like windings 5 and 7 through which alternating current is passed from a suitable alternating current source indicated at 8. The impedances of the windings 5 and 7, which depend upon the permeability of the respective cores 4 and 6, are compared by means of a Wheatstone bridge network of which the windings 5 and 7 form two arms and a resistor 9, divided into portions 9a and 9b forms the other two arms; a suitable indicating device 10 being connected as usual across the network to indicate the balanced condition of the network. Coil 5 and core 4 are enclosed in a container 11 of copper or the like and coil 7 and core 6 are enclosed in a similar container 12. The purpose of containers 11 and 12 may be readily explained. The alternating current flowing through coils 5 and 7 tends to induce eddy currents in rail 1 or in any other neighboring conductor, which currents in turn create fields which affect cores 4 and 6 and tend to disturb the balance of the bridge. The provision of containers 11 and 12 effectively confines the alternating fields created by the current through the coils and insures that any unbalance of the bridge will be due solely to a lack of uniformity in the rail structure.

In testing a specimen by means of the above described circuit, balance of the bridge network, as by adjustment of the relative values of portions 9a and 9b, is first established when no current is passed through the rail or when the test circuit is sufficiently removed from the rail as to have the cores 4 and 6 out of the influence of the magnetic field about the rail. The cores 4 and 6 are then disposed at equal distances from the rail so as to be subjected to magnetic fields which, if the rail were uniform, would be equal. If the magnetic fields affecting cores 4 and 6 are in fact equal then the network will remain in balance when current is passed through the rail because the permeabilities of both cores will be equally affected and the impedances of coils 5 and 7 will be changed by a like amount. If the magnetic fields are unequal, due, as above described, to a flaw in the rail beneath one or the other of the cores, the bridge will become unbalanced with resulting passage of current through the indicating device.

Within a range of relatively low field strengths changes in permeability are relatively large with small changes in magnetic field strengths while at field strengths in the neighborhood of the saturation point the same changes in field strength cause but small changes in permeability. For this reason, for sensitive operation of the circuit, the average field strength should be low enough to fall within the range where the permeability changes rapidly. The average strength of field affecting the cores may be varied by increasing the distance of the cores from the rail or by varying the direction of the axis of the core relative to the rail. The effect of the magnetic field upon the cores 4 and 6 is greatest when the axis of the cores are placed transversely of the rail and is least when the cores are placed longitudinally of the rail. For cores of a material such as some nickel iron alloys whose permeability changes rapidly at low field strengths and for currents through rail 1 of the order of 1000 amperes, the preferred orientation of the cores 4 and 6 is that illustrated in Fig. 1 where the axis of each core makes an angle of about 45 degrees with the direction of the rail, as with this orientation the test circuit may be made extremely sensitive to differences in field strengths affecting the cores. When the test circuit and both cores 4 and 6 are moved along the rail, a single flaw in the rail will be indicated twice, first when one core is adjacent thereto and again when the other core is adjacent thereto. Occasionally flaws may occur at a distance apart equal to that between the cores, in which case unless particular care is taken to take measurement substantially continuously, errors may be introduced in the interpretations of indicators. To avoid such possibilities of error and to insure generally more accurate investigation of each point of the rail, the preferred method of use of the test circuit is to maintain stationary one core and the coil associated therewith and to move the other core and coil along the rail, sufficiently long conducting leads being provided, of course, to allow for the required relative movement of the coils. When but one coil is moved and the other kept stationary, the latter becomes in effect a standard with which comparison is made at each position of the moving coil.

The circuit disclosed in Fig. 2 differs from that of Fig. 1 primarily in the inclusion of means for adjusting the average value of the field strengths affecting cores 4 and 6, which means include a pair of windings 14 and 15, an ammeter 16 and a variable resistor 17, all connected in series across a source 18 of direct current; windings 14 and 15 being located near coils 5 and 7 respectively, but preferably not coaxial therewith. In Fig. 2 coils 5 and 7 have been indicated diagrammatically only and the shielding containers 11 and 12 have not been illustrated. It will be understood, however, that in Fig. 2 coils 5 and 7 are wound about cores 4 and 6 respectively and are preferably shielded by suitable conducting shells just as described in connection with the circuit of Fig. 1.

The operation of the circuit of Fig. 2 differs in no material respect from that of Fig. 1 except that the strength of direct current through coils 14 and 15 is first adjusted by means of resistor 17 to insure average field strengths affecting cores 4 and 6 such that the permeability of the cores will vary decidedly with departure of the field strength in either direction from the average value. The fields created by coils 14 and 15 may be in the same direction as that created by the current through the rail or may be in the opposite direction from such field, depending upon the strength of current through the rail and upon the material of which the cores are composed. The proper direct current for coils 14 and 15 having once been selected, the test circuit is moved along the rail to compare different portions of the field, or preferably coils 5 and 14 and core 4 are kept stationary and coils 7 and 15 and core 6 are moved along the rail as described in connection with Fig. 1.

The strength of the compensating or correcting fields created by coils 14 and 15 can be varied not only by adjusting the resistor 17 but also by varying the distance between either coil and the respective core affected by the field thereof in which latter case independent adjustment of the fields is possible. Preferably, however, when independent adjustment of the compensating fields is to be effected, additional direct current coils are provided for this purpose. In Fig. 3 a circuit arrangement is illustrated which permits joints and also independent adjustment of the average field strength affecting the cores and which includes also additional means for increasing the sensitivity of the test circuit.

In the interests of simplicity the rail or other conductor to be tested has not been illustrated in Fig. 3, but it will be understood that cores 4 and 6 are located adjacent the body under test so as to be subjected to different portions of the field about the conductor just as in Figs. 1 and 2. In Fig. 3 coil 5 together with an adjustable resistor 20 forms one arm of a bridge network and coil 7 together with an adjustable resistor 21 forms another arm of the bridge; adjustable capacities 22 and 23 forming the other two arms of the bridge. As most sensitive and accurate measurement may be made when the frequency of the current through coils 5 and 7 is practically constant, the source of alternating potential 24, for the network, is indicated as a constant frequency source and is shown connected across the bridge through an amplifier 25. Source 24 may be, for example, a tuning fork oscillator or any other known means for supplying voltage at constant frequency.

The condition of the bridge is indicated by an ammeter or other indicating device 26 which is illustrated as coupled to the output circuit of an amplifying tube 27 by means of a transformer 28; the input terminals of the tube being connected across the capacity arms of the bridge network.

In order to adjust the average field strengths affecting cores 4 and 6, windings 14 and 15 are provided adjacent coils 5 and 7 as in Fig. 2. For independent adjustment of the average field strength affecting each core, additional windings 30 and 31 are provided. Coil 30 is connected in series with an ammeter 32 across an adjustable portion of a potentiometer 33. Similarly coil 31 is connected in series with an ammeter 34 across a separately adjustable portion of potentiometer 33; potentiometer 33 is connected in parallel with windings 14 and 15 across the source 18, variable resistance 17 and ammeter 16. It will be understood that windings 14 and 30 are not coaxial with coil 5 and core 4 and that coil 5 and core 4 are located within the shielding container 11 as in Fig. 1. Similarly coils 15 and 31 are not coaxial with coil 7 and core 6 and coil 7 and core 6 are located within the sheilding container 12.

In operation of the circuit above described, the bridge circuit is first balanced when no current is passed through the rail or other conductor being tested. In balancing the bridge, capacity 22 is adjusted until the circuit including coil 5 and capacity 22 is tuned to resonate at the frequency of the source 24. Similar capacity 23 is adjusted to tune the circuit including coil 7 and capacity 23. Tuning these circuits causes a maximum current to flow therethrough and hence a departure in the bridge network from balance will cause an alternating potential of relatively large amplitude to be impressed across the input terminals of the amplifier 27. Theoretically, with coils 5 and 7 of a like number of turns and cores 4 and 6 of the same materials and dimensions, resistances 20 and 21 would not be required for balance of the bridge. Practically, however, because of the fact that electrical elements can rarely be made identical, some resistance will be required in at least one arm of the bridge. Resistances 20 and 21 need not be large and should permit adjustment to zero value, as with properly constructed coils a small amount of resistance in one or both arms will be sufficient.

When the bridge network has been adjusted for balance and the circuits tuned as above described, current is passed through the conductor to be tested and the average field affecting the cores is adjusted to the desired value by means of resistor 17; the variable contacts along potentiometer 33 being preferably so positioned that equal currents flow through coils 30 and 31. If now, as the test apparatus is moved along the conductor, the fields affecting cores 4 and 6 depart from equality, the bridge network will become unbalanced, causing an alternating potential to be impressed upon the amplifier 27 with resultant flow of current through the indicating device 26. The current indication of ammeter 26 may be considered as a measure of the difference in the fields affecting cores 5 and 7 if desired. Preferably, however, when meter 26 indicates that the bridge is unbalanced, the current through one or the other of coils 30 and 31 is adjusted by means of the taps along potentiometer 33 until the bridge is restored to balance and the change in current required to restore balance, as indicated by meter 32 or 34 respectively, taken as a measure of the magnitude of the disturbance in the rail which caused the unequality of the fields and the consequent unbalance of the bridge.

The circuit of Fig. 3 thus provides an extremely sensitive apparatus for detecting differences in field strengths due to flaws in a conductor through which current is passed and for determining directly or by compensation the relative magnitudes of such changes.

As with the test circuits of Figs. 1 and 2, measurements may be made while the test circuit and cores are stationary over the rail or while one or both cores are moved longitudinally thereover as any errors in the measurements which might be introduced by the induction of current into the test circuits from the movement of the circuit relative to the field about the rail are so small as to be negligible. Moreover even such small errors as might occur could be readily eliminated by suitable filtering as will be well understood by one skilled in the art.

The invention has now been described with specific reference to its utility in testing rails. Obviously the new method and apparatus may be advantageously used in testing any conductor of substantially uniform cross section, whether of magnetic or non-magnetic material. Although it is preferred to create the magnetic field about the conductor being tested by passage of direct current therethrough, alternating current could be used for this purpose if it were not required to detect with accuracy flaws greatly removed from the surface of the conductor. If alternating current is used, then preferably a suitable filter tuned to the frequency of the current passed through the specimen should be connected between the indicating device and the rest of the test circuit. In some cases it may be advantageous to send both alternating and direct current through the conductor being tested as, if a flaw is indicated when direct current is used, and not when alternating current is used the flaw is thus located as being well within the conductor at a point to which the alternating current can not penetrate.

Obviously the new method may be practiced with other test circuits than those described and various changes could be made in the particular circuits illustrated without departing from the spirit of the invention.

This application is a continuation in part of applicant's application Serial No. 604,725, filed April 12, 1932.

The following is claimed.

1. The method of testing rails or the like which includes creating a magnetic field about the specimen to be tested by passing current therethrough, positioning a ferro-magnetic body in the created field so as to have its permeability affected thereby and noting the effect of the permeability of said body upon the impedance of a circuit associated therewith and through which alternating current is continuously passed.

2. The method of testing rails or the like which includes creating a magnetic field about the specimen to be tested by passing current therethrough, comparing the strength of the field at two different locations along the specimen and equidistant therefrom by noting the effect of the permeability of like bodies of ferro-magnetic material subjected to the fields at such locations upon the impedance of two like windings associated with the bodies and through which alternating current is passed.

3. The method of testing rails or the like which includes passing direct current through the rail to create a magnetic field whose distribution about the rail is a function of the physical and chemical characteristics thereof, subjecting like ferro-magnetic bodies to different portions of the created field along the rail so as to have their permeability affected thereby and comparing the permeability of the bodies by noting the effect thereof upon the impedance of windings associated therewith and through which alternating current is continuously passed.

4. The method according to claim 3, including adjusting the average field strength affecting the fero-magnetic bodies to a value well below the saturation point so as to be within the range where the permeability of the bodies changes rapidly with field strength.

5. In combination with a rail or the like, testing apparatus therefor including means for passing current through the rail to create a magnetic field thereabout whose distribution depends upon the physical and chemical characteristics of the rail, a ferro-magnetic body located within said field so as to have its permeability affected thereby, a winding about said body, an independent source of alternating current associated with said winding for passing current therethrough and an indicating device associated with said winding for determining the effect of the permeability of said body upon the impedance of said winding.

6. In combination with a rail or the like, testing apparatus therefor including means for passing current through the rail to create a magnetic field thereabout whose distribution depends upon the physical and chemical properties of the rail, a pair of ferro-magnetic bodies located within said field and disposed at equal distances from longitudinally separated points of the rail so as to have their permeability influenced by the field about different portions of the rail, a winding about each body, a source of alternating voltage associated with said windings to cause passage of alternating current therethrough, and means including an indicating device associated with said windings for indicating when the permeability of said bodies causes a difference in the impedance of said windings.

7. The combination according to claim 6 including means for adjusting the average field strength affecting said bodies, said means including a separate source of direct current and a second pair of windings, each of said last mentioned pair of windings being positioned adjacent one of the first mentioned pair of windings.

8. The combination according to claim 6 including a container of electrically conducting material enclosing each of said windings and the ferro-magnetic bodies associated therewith to confine the alternating fields set up by the current through said windings.

9. Magnetic testing apparatus for comparing magnetic fields set up about a conductor comprising in combination a pair of ferro-magnetic bodies located in the fields to be compared, a winding about each of said bodies, a Wheatstone bridge network including said windings in two arms thereof, a source of alternating voltage connected to said network for continuously supplying current to said windings and a device connected to said network adapted to indicate the condition thereof.

10. The combination according to claim 9 including an amplifier and wherein the other two arms of said network include adjustable capacities, said indicator being connected across said capacity arms of the bridge through said amplifier whereby when the network is tuned to resonate at the frequency of said source maximum indication is given by said indicator for each degree of unbalance of the bridge.

11. The combination according to claim 9 including a source of direct current and a pair of windings and a variable resistor connected in series thereacross, each of said windings being located adjacent one of the windings of said bridge whereby adjustment of the average field strength affecting said ferro-magnetic bodies may be affected.

12. The combination according to claim 9 including means for adjusting in unison the average field strength affecting said ferro-magnetic bodies and including additional means for independently adjusting the fields affecting said bodies.

13. Apparatus for comparing magnetic fields set up about a conductor comprising in combination a constant frequency source of alternating potential, a pair of windings forming arms of a Wheatstone bridge network to which current is delivered from said source, a ferro-magnetic body within each of said windings and located within the magnetic fields to be compared and a conducting shield about each of said windings and the body associated therewith.

In testimony whereof, I have signed my name to this specification.

THEODOR ZUSCHLAG.